F. VAN DOREN.
Horse Hay Fork.
No. 123,063.                    Patented Jan. 23, 1872.
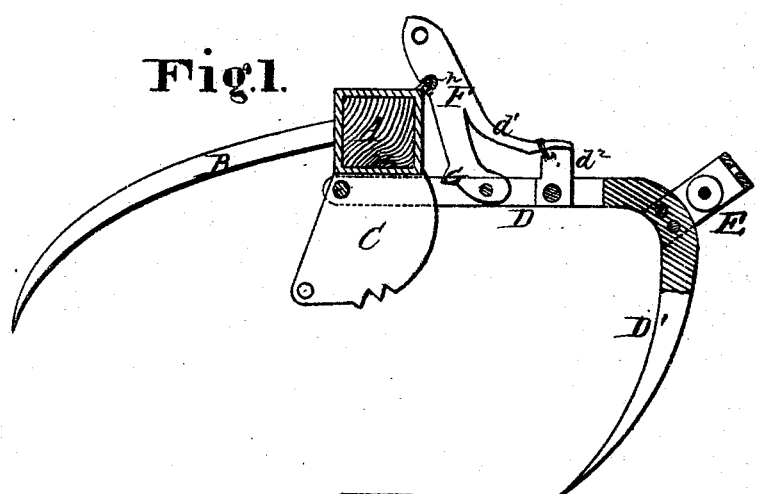
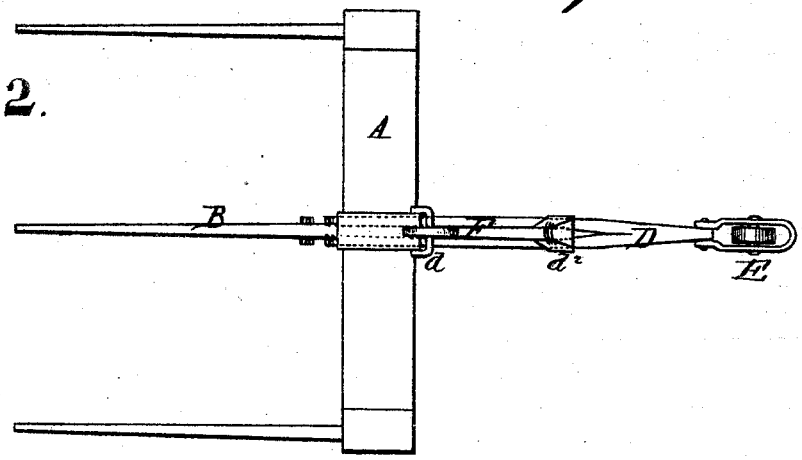
Witnesses.
E. H. Bates
F. B. Curtis
Inventor
F. Van Doren,
Chipman Hosmer & Co,
Attys.

123,063

UNITED STATES PATENT OFFICE.

FRANCIS VAN DOREN, OF ADRIAN, MICHIGAN.

IMPROVEMENT IN HORSE HAY-FORKS.

Specification forming part of Letters Patent No. 123,063, dated January 23, 1872.

*To all whom it may concern:*

Be it known that I, F. VAN DOREN, of Adrian, in the county of Lenawee, and State of Michigan, have invented a new and valuable Improvement in Horse Hay-Forks; and I do hereby declare that the following is a full, clear, and exact description of the construction and operation of the same, reference being had to the annexed drawing making a part of this specification, and to the letters and figures of reference marked thereon.

Figure 1 of the drawing is a representation of a central vertical section of my invention. Fig. 2 is a rear view of the same.

This invention has relation to a horse hay-fork having a fork-head pivoted to the arm of a curved tine; and it consists in the novel construction and arrangement of a tripping device, which, when the fork is opened to release its load, catches a projection on the fork-head and keeps the fork and tine-arm rigidly together, thereby rendering the insertion of the fork into the hay to be carried much easier than when the fork is allowed to swing.

Referring to the accompanying drawing, A represents a stout fork-head, armed with curved tines B, and provided with a segmental notched plate or rack, C, projecting from its inner side, and with a catch, $d$, projecting from its upper outer angle in any oblique direction. D D' designates a combined handle and tine. The handle D is pivoted to the plate C. The tine is curved forward and downward, so as to meet the points of the tines B when the fork is closed over a load of hay. E designates a pulley, secured to the upper part of the combined tine and arm or handle. Around the wheel of said pulley is passed the rope by which the fork is raised and lowered. The lower part of the handle D is slotted, and has pivoted to it the end of a latch, F, constructed with an angular projection, G, which engages with the teeth of the rack C, and keeps the fork closed as long as may be desired. A cord fastened to the outer end of the latch, serves as a means for tripping it. Near the outer end of said latch a notch, $h$, is cut, which, when the fork is opened, receives the catch $d$. The latch is constructed with a diverging arm, $d^1$, which rests against an India-rubber spring, $d^2$, secured to the handle D. The object of this spring is to keep the latch and catch $d$ in contact. The latch is released from the catch by the hand or by drawing on the cord above mentioned. The object of locking the fork-head and tine-handle rigidly together is to allow of the more ready use of the fork in inserting the tines B into the hay, the handle B being used as a handle by which to wield the fork.

I claim as my invention—

In a horse hay-fork, the latch F pivoted to the arm D, and constructed with the notch $h$ adapted to receive the catch $d$, and with the arm $d^1$ resting against the spring $d^2$, substantially as described.

In testimony that I claim the above I have hereunto subscribed my name in the presence of two witnesses.

FRANCIS VAN DOREN.

Witnesses:
R. R. ROBBINS,
WM. L. GRUNLY.